Oct. 31, 1944.  S. SCHNELL  2,361,878
FLUID PRESSURE COMPOUNDING SYSTEM
Filed July 2, 1943
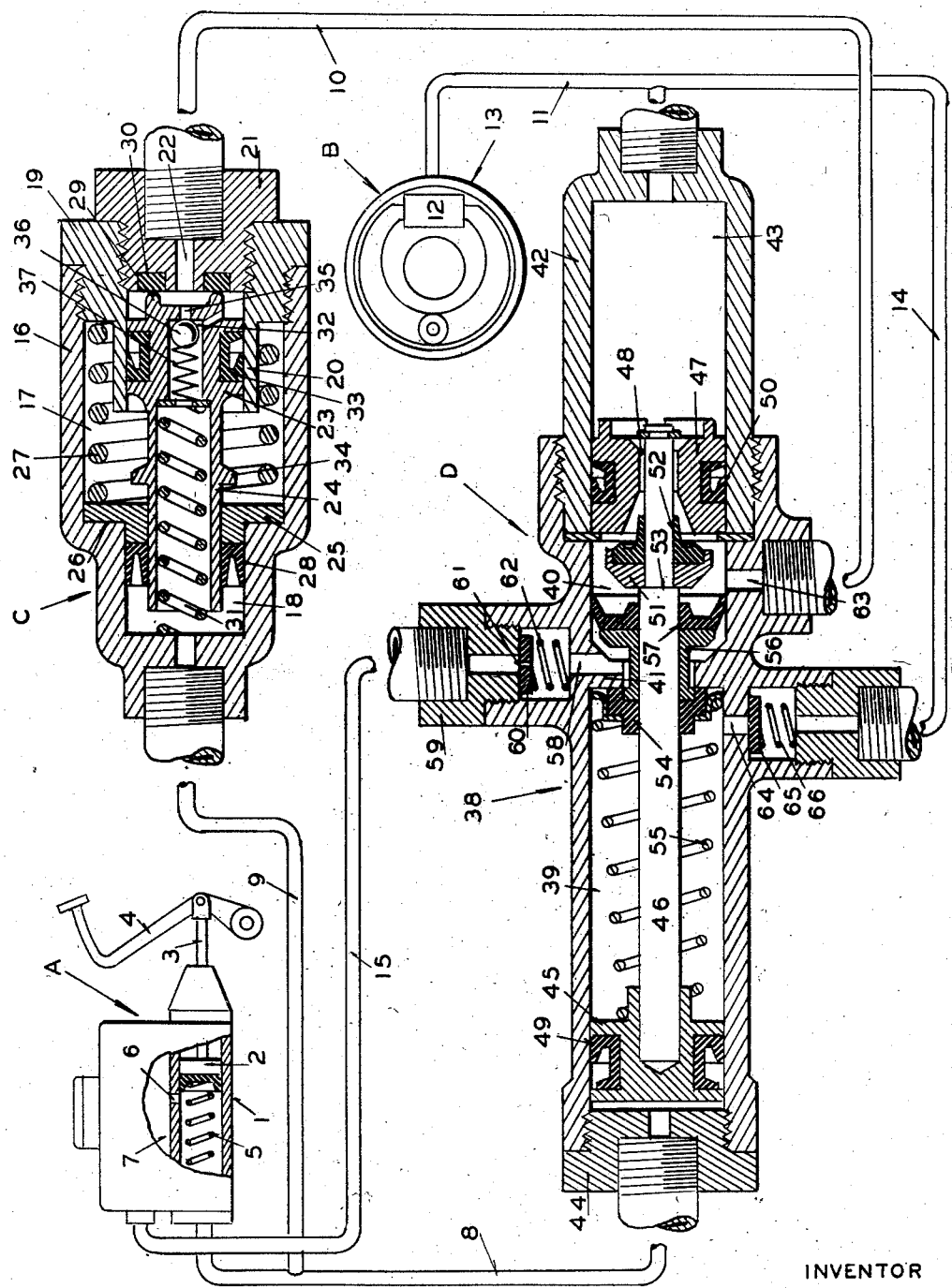
INVENTOR
S. SCHNELL
BY *[signature]*
ATTORNEY Patented Oct. 31, 1944

2,361,878

UNITED STATES PATENT OFFICE 2,361,878

FLUID PRESSURE COMPOUNDING SYSTEM

Steve Schnell, Kirkwood, Mo., assignor to Wagner Electric Corporation, St. Louis, Mo., a corporation of Delaware Application July 2, 1943, Serial No. 493,235

16 Claims. (Cl. 60—54.5)

My invention relates to a fluid pressure system and more particularly to one which embodies compounding means whereby fluid pressure from the source can establish a greater fluid pressure for operating a device after a predetermined pressure is reached.

One of the objects of my invention is to produce a fluid pressure compounding system which will permit fluid under pressure from a source to act on an area of a movable member and cause a greater area of the movable member to develop fluid pressure to operate a device until a predetermined pressure is reached which will then permit fluid pressure from the source to act on a larger area of the movable member to cause a smaller area of the movable member to develop fluid pressure to operate the device.

Another object of my invention is to provide a fluid pressure system with means causing two inter-connected pistons to develop fluid pressure by having one of the pistons acted on by fluid pressure from the source until said fluid pressure from the source reaches a predetermined pressure whereafter both pistons will be acted on by fluid pressure from the source but only one piston will be caused to develop fluid pressure.

Other objects of my invention will become apparent from the following description taken in connection with the accompanying drawing in which the single figure is a schematic view of a fluid pressure system embodying my invention, the compounding unit and the control valve unit thereof being enlarged and shown in section.

Referring to the drawing in detail, the fluid pressure system in which my invention is embodied is shown, by way of example, as being employed for operating brakes but it is understood that it may be employed, if desired, for operating any device or apparatus. The system shown comprises essentially four units, namely, a manually-controlled master cylinder device A, a brake B, a control valve unit C, and a compounding unit D.

The master cylinder device A is of known construction and comprises a cylinder 1 having reciprocable therein a piston 2 connected by a piston rod 3 to pedal 4. The piston is biased to retracted position by spring 5 where it uncovers a porthole 6 for placing the portion of the cylinder ahead of the piston in communication with reservoir 7. The outlet of the master cylinder device is connected to one end of the compounding unit D by conduit 8. This conduit 8 has a branch conduit 9 which is connected to one end of the control valve unit C. The other end of this control valve unit is connected to the central part of the compounding unit D by means of conduit 10. The other end of unit D is connected by conduit 11 with fluid motors 12 for operating the brake assemblies 13. A conduit 14 connects the central part of unit D with conduit 11 for also furnishing fluid under pressure to fluid motors 12. A conduit 15 connects unit D with reservoir 7 of the master cylinder device.

The control valve unit C is embodied in casing 16 having a large cylinder 17 and a small cylinder 18, the latter being connected to branch conduit 9, previously referred to. Carried by the casing is a member 19 provided with a cylinder 20 extending into cylinder 17 and slightly smaller in diameter than cylinder 18. The outer end of cylinder 20 is closed by a fitting 21 to which conduit 10 is connected, said fitting 21 having a passage 22 for placing the conduit in communication with cylinder 20. Cylinder 20 has mounted therein a piston 23 provided with a hollow extension 24 extending into cylinder 18. This extension projects through a movable piston in the form of a wall 25 at the juncture of cylinders 17 and 18, said wall being biased into engagement with shoulder 26 between said cylinders by means of a coil spring 27 interposed between the wall and member 19 which carries cylinder 20. A packing cup 28 is associated with the wall and extension 24 for preventing fluid from flowing past the wall.

The piston 23 is provided at its forward end with a valve element 29 for engagement with valve seat 30 surrounding passage 22 in fitting 21. This valve element is biased to seated position by a spring 31 positioned in extension 24 and interposed between piston 23 and the end of cylinder 18. A passage 32 through piston 23 connects the portion of cylinder 20 ahead of the piston with the hollow extension 24 so that fluid under pressure entering cylinder 18 through conduit 9 may also be effective in cylinder 20 ahead of piston 23. A packing cup 33 is associated with piston 23 for preventing leakage past the piston. In order to limit the unseating movement of piston 23, extension 24 carries an annular flange 34 for engaging the movable wall 25. By means of this flange, wall 25 can act to move the piston and re-seat the valve element under certain conditions. Piston 23 also has an axial passage 35 which is controlled by a check valve element 36 biased to closed position by a spring 37. This check valve element permits fluid to flow from outlet passage 32 and conduit 10 past piston 23 to conduit 9 and the master cylinder device but prevents flow of fluid in the opposite direction through passage 35.

The compounding unit D is provided with a main casing 38 having a cylinder 39 and a chamber 40 between which is an annular wall 41. The portion of the casing having chamber 40 has screwed therein a second casing member 42 which is provided with a second cylinder 43 of the same size as cylinder 39. The outer end of this cylinder 43 is connected with conduit 11 leading to the brake unit B. The outer end of cylinder 39 is closed by a plug 44 forming a connection with conduit 8 coming from the master cylinder device.

Within cylinder 39 is a piston 45 to which is connected a rod 46 extending through the opening in wall 41 into chamber 40 and cylinder 43. Slidably associated with the forward end of this rod is a second piston 47 positioned in cylinder 43. Slots 48 in the inner portion of piston 47 permit fluid to by-pass the piston. Piston 45 has associated therewith a packing cup 49, and a packing cup 50 seals the periphery of piston 47. Mounted on rod 46 at the rear of piston 47 is a disc member 51 with which is associated a yieldable valve element 52 for cooperation with the rear face of piston 47 to cut off flow of fluid through the piston. A shoulder 53 on the piston rod cooperates with the disc member so that when the piston rod is moved forwardly, the yieldable element 52 can engage the rear surface of piston 47 and move this piston.

The opening in wall 41 is larger than the piston rod and associated with this opening and the piston rod is a valve element 54 normally biased to engage the wall by a spring 55. This valve element prevents flow of fluid from cylinder 39 to chamber 40 when the valve element is seated. Connected to the valve element is a flanged member 56 slidably mounted on rod 46 in chamber 40. The flange of this member 56 has a packing cup 57 associated therewith for preventing any fluid in chamber 40 from escaping therefrom past member 56 but not preventing flow of fluid to chamber 40 by slipping past the periphery of the cup. When valve element 54 is held closed by spring 55, the flange of member 56 will be held away from wall 41. However, if fluid under pressure should be present in chamber 40 forward of cup 57, it will force member 56 against wall 41 and cause unseating of valve element 54. Fluid is permitted to enter between the flange of member 56 and the valve element 54 from the reservoir of the master cylinder device by way of the conduit 15 previously referred to. As shown, the conduit is connected to a passage 58 extending through a portion of wall 41. A fitting 59 is employed for connecting conduit 15 to the passage. Cooperating with this fitting is a disc 60 having a small orifice 61. A spring 62 biases the disc against the fitting. This disc establishes a restricted flow of fluid back to reservoir 7 but does not have any appreciable effect in restricting flow of fluid from the reservoir since the fluid can push it away from the fitting and flow around the periphery of the disc.

The chamber 40 between cup 57 and piston 47 is connected to conduit 10 previously referred to, there being a passage 63 in the wall of casing 38 to establish the connection. The forward end of cylinder 39 is connected to the previously referred to conduit 14 which connects with the conduit 11 leading to the brake, the connection being made by way of a passage 64 in the wall of the cylinder. Associated with passage 64 is a check valve element 65 biased to closed position by a spring 66. This check valve element prevents return of fluid to the cylinder 39 from the fluid motor of the brake.

Referring to the operation of the system, all the parts of the various units will be in the positions shown when the system is inoperative. It is to be noted that valve element 29 of the control valve unit C is seated and no fluid can pass from conduit 9 to conduit 10. The yieldable element 52 on rod 46 will be unseated from the rear face of piston 47 so that if there is any expansion of fluid in cylinder 43 or the fluid motor of the brake, fluid is free to flow back to the master cylinder device by way of conduit 10, the check valve element 36, and conduit 9. The valve element 54 will be seated against wall 41 by spring 55. If there should be any contraction of the fluid in cylinders 39 and 43 or the fluid motor of the brake causing a sub-atmospheric pressure, such can be compensated for by fluid from the reservoir of the master cylinder device slipping past cup 57 or unseating the valve element 54.

If the master cylinder device should be operated by the brake pedal, fluid under pressure will be developed and will flow through conduit 8 and act on piston 45. Piston 45 will now be moved to the right as will rod 46 and the yieldable element 52 causing the latter to engage piston 47. Continued movement of piston 45 results in a simultaneous movement of piston 47 therewith. The master cylinder developed pressure will thus cause both pistons to develop fluid pressure in their cylinders. The fluid pressure developed in cylinder 39 will be transmitted past the check valve element 65 to the fluid motor of the brake. The fluid pressure developed by piston 47 will be transmitted directly through conduit 11 to the fluid motor of the brake. There will be no flow of fluid under pressure from conduit 9 to conduit 10 due to the closed condition of valve element 29. It is to be noted during this operation of the master cylinder device that for each unit of volume displaced by the master cylinder piston, there will be twice this volume of fluid displaced by the pistons 45 and 47. Consequently, the brake shoes can be brought into engagement with the drum with a short pedal travel. The pressure of fluid developed by the master cylinder device, however, will be twice that of the fluid pressure effective in the fluid motor of the brake. During the forward movement of piston 47 sub-atmospheric pressure will tend to develop in chamber 40 which will cause fluid to be drawn past the periphery of cup 57 from the reservoir of the master cylinder device. Thus this chamber 40 will always remain filled with fluid.

When the fluid pressure developed by the master cylinder device reaches a predetermined value, valve element 29 will be unseated and fluid under pressure can flow from conduit 9 to conduit 10 and then into chamber 40. The predetermined fluid pressure at which valve element 29 opens depends upon the strength of spring 31 and the sizes of the various surface areas acted on by fluid pressure. For the purpose of this description, this predetermined pressure may be considered as one hundred pounds per square inch. When the valve element 29 opens, the piston 23 will be moved to the left and flange 34 will engage wall 25. With the fluid in chamber 40 now subjected to the fluid pressure developed by the master cylinder device, cup 57 and member 56 will be forced to the left until the flange of member 56 engages wall 41. This movement of member 56 will cause the valve element 54 to be unseated from the wall and cylinder 39 to be connected with the reservoir of the master cylinder device. Although the fluid pressure in cylinder 39 will be the same as in chamber 40, the unseating of valve element 54 will take place since the area of cup 57 exposed to fluid under pressure is greater than the area of the valve element 54 exposed to fluid under pressure. When the fluid pressure in cylinder 39 is relieved by the opening of valve element 54, fluid under pressure in the fluid motor of the brake, however, will be prevented from being relieved by the check valve element 65.

As the master cylinder continues to be operated and additional fluid pressure is developed, the fluid under pressure will be effective on piston 45 and also on piston 47 and the pressures on both pistons will act to cause piston 47 to develop additional fluid pressure to apply the brake. Since pistons 45 and 47 have the same area, then for each unit of fluid displaced by the master cylinder device there will be a half unit displaced by piston 47. Each pound of pressure developed by the master cylinder device will cause two pounds of pressure to be developed by piston 47. Consequently, it is seen that there will be a compounding or boosting action and it will only be necessary to develop a fluid pressure by the master cylinder device which is half that desired in the fluid motor of the brake.

The continued operation of the master cylinder device will result in continued operation of the fluid motor by the higher developed fluid pressure. However, when a second predetermined fluid pressure is developed by the master cylinder device, valve element 29 will become reclosed. This is brought about by the fluid pressure from the master cylinder device acting on wall 25 and compress-spring 27 to cause reseating of the valve element. If this second predetermined pressure is considered as seven hundred and fifty pounds per square inch, then the fluid pressure effective in the fluid motor of the brake when the valve element 29 is closed will be approximately fifteen hundred pounds per square inch. After the closing of valve element 29, it will be impossible to increase the fluid pressure in the brake fluid motor by increasing the fluid pressure developed by the master cylinder device unless the developed master cylinder fluid pressure exceeds the fifteen hundred pounds per square inch in the fluid motor. This will be apparent by noting that the fluid pressure developed by the master cylinder device is now only effective on piston 39 due to the closed condition of valve element 29.

When the fluid pressure developed by the master cylinder device is released, the parts will again assume their inoperative positions as shown in the figure. If valve element 29 has not been re-closed by the development of the seven hundred and fifty pounds per square inch pressure, it will become closed again when the fluid pressure developed by the master cylinder device drops below one hundred pounds per square inch. As the fluid pressure in chamber 40 drops to atmospheric pressure, spring 55 will be effective to reseat valve element 54. Any excess fluid in chamber 40 will return to the master cylinder device through conduit 10, past check valve element 36 and through conduit 9.

By providing the disc 60 with the restricted hole 61, it will not be possible for the fluid pressure in the cylinder 39 to drop to atmospheric pressure suddenly when valve member 54 is open. Because of this, the change-over by the compounding unit will not be appreciably noticed on the brake pedal. Pressure in cylinder 39 will be slowly relieved and the operator will hardly notice that the fluid pressure developed by the master cylinder device is beginning to act on both pistons instead of only one and that only one piston is becoming effective in developing fluid pressure which will be effective in the fluid motor of a brake.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure system, a source of fluid pressure, a fluid motor to be operated, two chambers each provided with a movable wall for developing fluid pressure therein, means for connecting the walls for simultaneous movement, conduit means for placing both chambers in communication with the fluid motor, valve means for causing fluid pressure from the source to act on one wall to thereby simultaneously move both walls to develop fluid pressure in both chambers for operating the fluid motor, valve means operable when the fluid pressure from the source is above a predetermined value for causing the fluid pressure from the source to act at said value on both movable walls to develop fluid pressure in one chamber only for operating the fluid motor, means to relieve the pressure in one of the chambers when only one is acting on said motor, and means to prevent the reverse flow of fluid to said one chamber.

2. In a fluid pressure system, a source of fluid pressure, a fluid motor to be operated, two chambers each provided with a movable wall for developing fluid pressure therein, means for connecting the walls for simultaneous movement, conduit means for placing both chambers in communication with the fluid motor, valve means for causing fluid pressure from the source to act on one wall to thereby simultaneously move both walls to develop fluid pressure in both chambers for operating the fluid motor, valve means operable when the fluid pressure from the source is above a predetermined value for causing the fluid pressure from the source to act on both movable walls to develop fluid pressure in one chamber only for operating the fluid motor, means to relieve the pressure in one of the chambers when only one is acting on said motor, means to prevent the reverse flow of fluid to said one chamber, and means for preventing the fluid pressure from the source from acting on the walls when the pressure from the source reaches a second predetermined value greater than the first predetermined value.

3. In a fluid pressure system, a source of fluid pressure, a fluid motor to be operated, two chambers each provided with a movable wall for developing fluid pressure therein, means for connecting the walls for simultaneous movement, conduit means for placing both chambers in communication with the fluid motor, means for causing fluid pressure from the source to act on one wall to thereby simultaneously move both walls to develop fluid pressure in both chambers for operating the fluid motor, means for causing the fluid pressure from the source to act on the other movable wall in addition to the first movable wall when the pressure from the source is above a predetermined value, and means for causing the fluid pressure developed in one chamber by simultaneous movement of the movable walls to be effective in the fluid motor during the operation of said last mentioned means.

4. In a fluid pressure system, a source of fluid pressure, a reservoir, a fluid motor to be operated, two chambers each provided with a movable wall for developing fluid pressure therein, means for connecting the walls for simultaneous movement, conduit means for placing both chambers in communication with the fluid motor, means for causing fluid pressure from the source to act on one wall to thereby simultaneously move both walls to develop fluid pressure in both chambers for operating the fluid motor, means operable when the fluid pressure from the source is above a predetermined value for causing the fluid pressure from the source to act on both movable walls, and means comprising valve means opened by fluid pressure from the source when above the predetermined value for connecting one of the chambers to the reservoir.

5. In a fluid pressure system, a source of fluid pressure, a fluid motor to be operated, two chambers each provided with a movable wall for developing fluid pressure therein, means for connecting the walls for simultaneous movement, conduit means for placing both chambers in communication with the fluid motor, means for causing fluid pressure from the source to act on one wall to thereby simultaneously move both walls to develop fluid pressure in both chambers for operating the fluid motor, means comprising pressure opened valve means for causing the fluid pressure from the source to act on the other movable wall in addition to the first movable wall when the pressure from the source is above a predetermined value, and means for causing the fluid pressure developed in one chamber by simultaneous movement of the movable wall to be effective in the fluid motor during the operation of said last mentioned means.

6. In a fluid pressure system, a source of fluid pressure, a fluid motor to be operated, two cylinders, pistons in the cylinders, means for connecting the pistons for simultaneous movement, conduit means for connecting both cylinders to the fluid motor, conduit means for causing fluid pressure from the source to act on one piston to thereby move both pistons and cause them to develop fluid pressure and operate the fluid motor, means for causing fluid pressure from the source to act on the other piston in addition to the first piston when the fluid pressure from the source is above a predetermined value, and means for releasing the fluid pressure in one cylinder to prevent it from being effective in the fluid motor when both pistons are being acted on by fluid pressure from the source.

7. In a fluid pressure system, a source of fluid pressure, a reservoir, a fluid motor to be operated, two cylinders, pistons in the cylinders, means for connecting the pistons for simultaneous movement, conduit means for connecting both cylinders to the fluid motor, conduit means for causing fluid pressure from the source to act on one piston to thereby move both pistons to cause them to develop fluid pressure and operate the fluid motor, means for causing fluid pressure from the source to act on the other piston in addition to the first piston when the fluid pressure from the source is above a predetermined value, means for connecting one cylinder to the reservoir when both pistons are acted on by fluid pressure from the source, and check valve means for preventing fluid under pressure in the motor from entering the last named cylinder when it is connected to the reservoir.

8. In a fluid pressure system, a source of fluid pressure, a reservoir, a fluid motor to be operated, two cylinders, pistons in the cylinders, means connecting the pistons for simultaneous movement, conduit means connecting the cylinders ahead of the pistons with the fluid motor, conduit means for causing fluid pressure from the source to act on the rear of one of the pistons, means for establishing a chamber at the rear of the other piston, means comprising valve means for connecting the cylinder having the first named piston therein with the reservoir, means for placing the chamber in communication with the source when the fluid pressure therefrom is above a predetermined value, means for opening the valve means by the fluid pressure from the source when above the predetermined value, and check valve means for preventing fluid under pressure from the motor escaping to the reservoir.

9. In a fluid pressure system, a source of fluid pressure, a reservoir, a fluid motor to be operated, two cylinders, pistons in the cylinders, means connecting the pistons for simultaneous movement, conduit means connecting the cylinders ahead of the pistons with the fluid motor, conduit means for causing fluid pressure from the source to act on the rear of one of the pistons, means for establishing a chamber at the rear of the other piston and having a movable wall, means comprising valve means controlled by the movable wall for connecting the cylinder having the first named piston therein with the reservoir, means for placing the chamber in communication with the source when the fluid pressure therefrom is above a predetermined value and for moving said wall to open the valve means, and check valve means for preventing fluid under pressure from the motor escaping to the reservoir.

10. In a fluid pressure system, a source of fluid pressure, a reservoir, a fluid motor to be operated, two axially aligned cylinders, pistons in the cylinders, a rod connecting the pistons for simultaneous movement, conduit means connecting the cylinders ahead of the pistons with the fluid motor, conduit means for causing fluid pressure from the source to act on the rear of one of the pistons, means for establishing a chamber at the rear of the other piston and having a movable wall, means comprising valve means controlled by the movable wall for connecting the cylinder having the first named piston therein with the reservoir, means for placing the chamber in communication with the source when the fluid pressure therefrom is above a predetermined value and for moving said wall to open the valve means, means for restricting the flow of fluid to the reservoir when the valve means is open, and check valve means for preventing fluid under pressure from the motor escaping to the reservoir.

11. In a fluid pressure system, a source of fluid pressure, a fluid motor to be operated, a cylinder, a piston in the cylinder, conduit means connecting the cylinder ahead of the piston with the motor, a second cylinder, a piston in the second cylinder, means for operatively connecting the pistons together, conduit means connecting the second cylinder ahead of the piston therein with the fluid motor, means for causing fluid pressure from the source to act on the rear of the second piston, means for causing fluid pressure from the source to act on the first piston in addition to the second piston when the fluid pressure from the source is above a predetermined value, and means for relieving the fluid pressure in the second cylinder forward of the piston thereof when the last named means is functioning.

12. In a fluid pressure system, a source of fluid pressure, a fluid motor to be operated, a cylinder, a piston in the cylinder, conduit means connecting the cylinder ahead of the piston with the motor, a second cylinder, a piston in the second cylinder, means for operatively connecting the pistons together, conduit means connecting the second cylinder ahead of the piston therein with the fluid motor, valve means for causing fluid pressure from the source to act on the rear of the second piston, valve means for causing fluid pressure from the source to act on the first piston in addition to the second piston when the fluid pressure from the source is above a predetermined value, means comprising valve means for relieving the fluid pressure in the second cylinder forward of the piston thereof when the last named means is functioning, and means for opening the valve means by the fluid pressure acting on the first piston.

13. In a fluid pressure system, a master cylinder provided with a reservoir, a fluid motor to be operated, a cylinder, a piston in the cylinder, conduit means connecting the cylinder ahead of the piston with the motor, a second cylinder, a piston in the second cylinder, means for operatively connecting the pistons together, conduit means connecting the second cylinder ahead of the piston therein with the fluid motor, a check valve associated with the last named conduit means and preventing flow of fluid from the motor to the second cylinder, valve means for causing fluid pressure from the master cylinder device to act on the rear of the second piston, valve means for causing fluid pressure from the master cylinder device to act on the rear of the first piston in addition to the second piston when the fluid pressure developed is above a predetermined value, and means for connecting the second cylinder forward of the piston thereof to the reservoir when fluid pressure from the master cylinder device is acting on the rear of the first piston.

14. In a fluid pressure system, a master cylinder provided with a reservoir, a fluid motor to be operated, a cylinder, a piston in the cylinder, conduit means connecting the cylinder ahead of the piston with the motor, a second cylinder, a piston in the second cylinder, means for operatively connecting the pistons together, conduit means connecting the second cylinder ahead of the piston therein with the fluid motor, a check valve associated with the last named conduit means and preventing flow of fluid from the motor to the second cylinder, valve means for causing fluid pressure from the master cylinder device to act on the rear of the second piston, means comprising a pressure-controlled valve adapted to be opened to cause fluid pressure from the master cylinder device to act on the rear of the first piston in addition to the second piston when the fluid pressure developed is above a predetermined value, means for connecting the second cylinder forward of the piston thereof to the reservoir when fluid pressure from the master cylinder device is acting on the rear of the first piston, and means for closing the valve when the fluid pressure from the master cylinder device reaches a second predetermined value greater than the first predetermined value.

15. In a fluid pressure system, a reservoir, a fluid motor to be operated, two cylinders, pistons in the cylinders, connecting means between the pistons for permitting simultaneous movement, a conduit for connecting both cylinders to the fluid motor, conduit means for causing fluid pressure from the source to act on the rear of one of the pistons to thereby move both pistons and cause each to develop fluid pressure to operate the fluid motor, means establishing a chamber at the rear of the other piston, means for permitting fluid pressure from the source to be effective in the chamber when the fluid pressure therefrom is above a predetermined value, means for connecting one of the cylinders with the reservoir when the fluid pressure from the source is above a predetermined value and for preventing fluid pressure in the motor from escaping to the reservoir, and means for permitting fluid in the chamber to return to the source at all times when the pressure in the chamber is above that of the source.

16. In a fluid pressure system, a reservoir, a fluid motor to be operated, two cylinders, pistons in the cylinders, connecting means between the pistons for permitting simultaneous movement, a conduit for connecting both cylinders to the fluid motor, conduit means for causing fluid pressure from the source to act on the rear of one of the pistons to thereby move both pistons and cause each to develop fluid pressure to operate the fluid motor, means establishing a chamber at the rear of the other piston, means for permitting fluid from the reservoir to enter the chamber as said other piston is moved, means for permitting fluid pressure from the source to be effective in the chamber when the fluid pressure therefrom is above a predetermined value, and means for connecting one of the cylinders with the reservoir when the fluid pressure from the source is above a predetermined value and for preventing fluid pressure in the motor from escaping to the reservoir.

STEVE SCHNELL.